(12) United States Patent
Yoshida et al.

(10) Patent No.: US 7,571,939 B2
(45) Date of Patent: Aug. 11, 2009

(54) PIPE JOINT

(75) Inventors: Naoki Yoshida, Kanagawa (JP);
Yoshikazu Kitamura, Kanagawa (JP)

(73) Assignee: Piolax, Inc., Yokohama-shi,
Kanagawa-ken (JP)

( * ) Notice: Subject to any disclaimer, the term of this patent is extended or adjusted under 35 U.S.C. 154(b) by 134 days.

(21) Appl. No.: 11/002,963

(22) Filed: Dec. 3, 2004

(65) Prior Publication Data

US 2005/0136741 A1    Jun. 23, 2005

(30) Foreign Application Priority Data

Dec. 5, 2003    (JP)    .......................... P. 2003-408125

(51) Int. Cl.
*F16L 39/00*    (2006.01)
(52) U.S. Cl. ..................... 285/321; 285/308; 285/317; 285/319
(58) Field of Classification Search ................. 285/305, 285/319, 317, 321, 308
See application file for complete search history.

(56) References Cited

U.S. PATENT DOCUMENTS

| | | | | |
|---|---|---|---|---|
| 3,326,580 A | * | 6/1967 | Munier et al. .................. 285/27 |
| 4,632,436 A | * | 12/1986 | Kimura ........................ 285/305 |
| 4,801,158 A | * | 1/1989 | Gomi .......................... 285/52 |
| 5,113,571 A | * | 5/1992 | Manska ......................... 29/453 |
| 5,290,974 A | * | 3/1994 | Douglas et al. ............. 181/228 |
| 5,575,512 A | * | 11/1996 | Umezawa .................... 285/319 |
| 5,779,019 A | * | 7/1998 | Grosspietsch et al. ..... 192/85 C |
| 5,860,677 A | * | 1/1999 | Martins et al. ................ 285/26 |
| 5,979,946 A | * | 11/1999 | Petersen et al. ............. 285/305 |
| 6,294,733 B1 | * | 9/2001 | Gibbons et al. ............... 174/51 |
| 6,474,698 B2 | * | 11/2002 | Dobler et al. ............... 285/321 |
| 7,387,318 B2 | * | 6/2008 | Yoshida ...................... 285/321 |
| 2004/0178629 A1 | * | 9/2004 | Yoshida ...................... 285/305 |
| 2004/0183300 A1 | * | 9/2004 | Iwasaki et al. .............. 285/282 |

FOREIGN PATENT DOCUMENTS

| | | | |
|---|---|---|---|
| JP | 2002-5375 | * | 1/2002 |
| JP | 2002-276878 | | 9/2002 |
| JP | 2003-21287 | * | 1/2003 |
| JP | 2003-232483 | * | 8/2003 |

OTHER PUBLICATIONS

Korean Office Action dated Nov. 17, 2006 with an English translation.

* cited by examiner

*Primary Examiner*—James M Hewitt
*Assistant Examiner*—Jay R Ripley
(74) *Attorney, Agent, or Firm*—McGinn IP Law Group, PLLC

(57) ABSTRACT

A pipe joint includes a socket, a plug, a retaining unit for preventing the plug from being drawn out from the socket, a seal ring arranged at an inner periphery of the socket and a hold ring arranged at the inner periphery of the socket for preventing the seal ring from being moved. A projected portion is formed at a position of the inner periphery of the socket for attaching the hold ring, and the hold ring includes a notched portion or a recess portion for engaging with the projected portion, and a projected portion projected in a direction of an inserting port of the plug, and the plug includes a ring-like projected portion for engaging with the retaining unit, and a recess portion or a flat portion provided at the ring-like projected portion to engage with the projected portion of the hold ring.

4 Claims, 8 Drawing Sheets

PIPE JOINT

BACKGROUND OF THE INVENTION

1. Field of the Invention

The present invention relates to a pipe joint of a quick connector type suitable for connecting pipes of, for example, a radiator, a heater unit, a fuel supply system or the like of an automobile, particularly relates to a pipe joint having a rotation preventing unit.

2. Description of the Related Art

There is used a pipe joint of a quick connector type in connecting pipes of, for example, a radiator, a heater unit, a fuel supply system or the like of an automobile. Generally, the pipe joint is provided with a socket substantially in a tubular shape attached to one pipe end, a plug substantially in a tubular shape attached to other pipe end and inserted into the socket, a retaining unit for preventing the plug from being drawn out from the socket, a seal ring arranged at an inner periphery of the socket for sealing the inner periphery of the socket and an outer periphery of the plug, and a hold ring arranged at the inner periphery of the socket for hampering the seal ring from being moved.

Meanwhile, depending on use thereof, there is a case in which not only a plug needs to be prevented from being drawn out from a socket but also the plug needs to be restricted from being rotated. There is known such a pipe joint in which, for example, an outer periphery of a plug is formed with a projected portion, and an inner periphery of a socket is formed with a guide groove along an axial direction inserted with the projected portion.

Meanwhile, JP-A-2002-276878, discloses a piping joint characterized in a piping joint including a male joint member having a spool portion, a female joint member, a retainer inserted from an window portion opened to a housing of the female joint member from a direction orthogonal to an axial direction for coupling the male joint portion and the female joint portion, and an O ring mounted to inside of the female joint member, in which the retainer is provided with a holding portion engaged with the spool portion of the male joint member for holding a distal end of the male joint member to be prevented from being drawn, and a rotation preventing unit for preventing the female joint member and the male joint member from being rotated relatively is constituted by cooperating the male joint member and the holding portion of the retainer.

Further, it is described that the holding portion includes a rib formed integrally with the retainer and bent in a U-like shape by following an outer peripheral face of the male joint member, and the rotation preventing unit includes a noncircular portion formed at the male joint member and having a noncircular cross-sectional face, and a fixing portion provided at the rib for fixing to be able to restrain the noncircular portion from being rotated.

However, according to the pipe joint of the background art in which the outer periphery of the plug is formed with the projected portion and the inner periphery of the socket is formed with the guide groove along the axial direction inserted with the projected portion, when, for example, a side of the plug is constituted by a metal pipe or the like, it is difficult to form the projected portion at the outer periphery and fabrication thereof is difficult.

According to the above-described pipe joint of JP-A-2002-276878, rotation thereof is restricted by providing the non-circular portion (for example, a flat portion) having the noncircular cross-sectional shape at the male joint member and providing the fixing portion engaged with the noncircular portion at the retainer, there poses a problem that a flow path diameter of the male joint member (plug) is narrowed at the noncircular portion, rotation is not restricted unless the retainer is pressed down, further, the retainer cannot be pressed down unless the male joint member constitutes a predetermined angle relative to the female joint member.

SUMMARY OF THE INVENTION

It is an object of the invention to provide a pipe joint capable of preventing a plug from being rotated relative to a socket without needing to work a complicated shape of the plug and without narrowing an inner flow path of the plug.

In order to achieve the above-described object, according to a first aspect of the invention, there is provided a pipe joint characterized in a pipe joint including a socket substantially in a tubular shape attached to one pipe end, a plug substantially in a tubular shape attached to other pipe end and inserted into the socket, a retaining unit for preventing the plug from being drawn out from the socket, a seal ring arranged at an inner periphery of the socket for sealing the inner periphery of the socket and an outer periphery of the plug, and a hold ring arranged at the inner periphery of the socket for hampering the seal ring from being moved, wherein a rotation restricting unit is provided between the inner periphery of the socket and the hold ring, the hold ring includes a projected portion projected in a direction of an inserting port of the plug, and the plug includes a ring-like projected portion for engaging with the retaining unit, and a recess portion or a flat portion provided at the ring-like projected portion to be engaged with the projected portion of the hold ring.

According to the above-described aspect of the invention, rotation of the hold ring relative to the socket is restricted by the rotation restricting unit, and the projected portion of the hold ring is engaged with the recess portion or the flat portion provided at the ring-like projected portion of the plug to thereby restrict rotation of the plug relative to the socket. By preventing the plug from being drawn out by the retaining unit under the state, the plug can be connected to the socket by preventing the plug from being rotated relative to the socket. The plug is only provided with the ring-like projected portion engaged with the retaining unit and the recess portion or the flat portion formed at the ring-like projected portion and therefore, even when the plug includes a metal pipe or the like, the plug can be worked comparatively easily.

According to a second aspect of the invention, there is provided the pipe joint, wherein the rotation restricting unit includes a projected portion formed at a position of the inner periphery of the socket for attaching the hold ring and a notched portion or a recess portion provided at the hold ring and fitted with the projected portion in the first aspect of the invention.

According to the above-described aspect of the invention, by fitting the notched portion or the recess portion provided at the hold ring to the projected portion at the inner periphery of the socket, rotation of the hold ring relative to the socket is restricted. According to the embodiment, the projected portion is not formed at the outer periphery of the socket and therefore, an outer shape of the connector can be made to be compact.

According to a third aspect of the invention, there is provided the pipe joint, wherein the rotation restricting unit includes a groove formed at the inner periphery of the socket to reach an opening portion of the socket along an axial direction and a projected portion provided at the outer periphery of the hold ring to be inserted into the groove in the first aspect of the invention.

According to the above-described aspect of the invention, the hold ring is provided with the projected portion without providing the notched portion and therefore, strength of the hold ring is increased, and the hold ring is difficult to be cracked when the hold ring is press-fitted into the socket. Further, the groove of the socket reaches the opening portion of the socket and therefore, the projected portion of the hold ring can be inserted into the groove to position at the opening portion of the socket and therefore, operation of inserting the hold ring is facilitated.

According to a fourth aspect of the invention, there is provided the pipe joint, wherein the projected portion provided at the outer periphery of the hold ring is projected in the direction of the inserting port of the plug to serve also as the projected portion, and the projected portion is engaged with the recess portion or the flat portion provided at the ring-like projected portion of the plug in the third aspect of the invention.

According to the above-described aspect of the invention, the projected portion provided at the outer periphery of the hold ring is projected as it is in the direction of the inserting port of the plug to constitute the projected portion as the rotation restricting unit relative to the socket, the projected portion is engaged with the recess portion or the flat portion provided at the ring-like projected portion of the plug and therefore, a section of the projected portion can be thickened in a radius direction. Further, in a state in which the projected portion is engaged with the recess portion or the flat portion provided at the ring-like projected portion of the plug, a total of the projected portion in a length direction thereof is inserted into the groove of the socket and therefore, even when a rotational force is operated between the plug and the socket, the rotational force can be received by the groove of the socket. Therefore, the projected portion can be made to be difficult to be broken and a rotation restricting force can be increased between the plug and the socket and between the socket and the hold ring.

According to a fifth aspect of the invention, there is provided the pipe joint, wherein the ring-like projected portion of the plug has a tapered shape which is contracted toward an inserting direction, and the ring-like projected portion is formed with a recess portion in a V-like shape in view from the axial direction in any one of the first through the fourth aspects of the invention.

According to the aspect of the invention, in inserting the plug, the projected portion of the hold ring is facilitated to be fitted to the recess portion of the ring-like projected portion of the plug and operation of inserting the plug is facilitated.

According to the pipe joint of the invention, in inserting the plug into the socket, a rotational position of the plug relative to the socket is restricted, further, by engaging the retaining unit, the plug can be simply connected to the socket by preventing the plug from being rotated relative to the socket. Further, even when the plug includes, for example, a metal pipe or the like, the engaging portion for preventing the plug from being rotated can easily be formed.

BRIEF DESCRIPTION OF THE DRAWINGS

These and other objects and advantages of this invention will become more fully apparent from the following detailed description taken with the accompanying drawings in which:

FIG. 2A is a right side view, FIG. 2B is a front view, and FIG. 2C is a sectional view thereof;

FIG. 4A is a right side view, FIG. 4B is a front view, and FIG. 4C is a sectional view taken along a line X-X thereof;

FIG. 5A is a left side view, and FIG. 5B is a sectional view thereof;

DETAILED DESCRIPTION OF THE PREFERRED EMBODIMENTS

Figure 1:
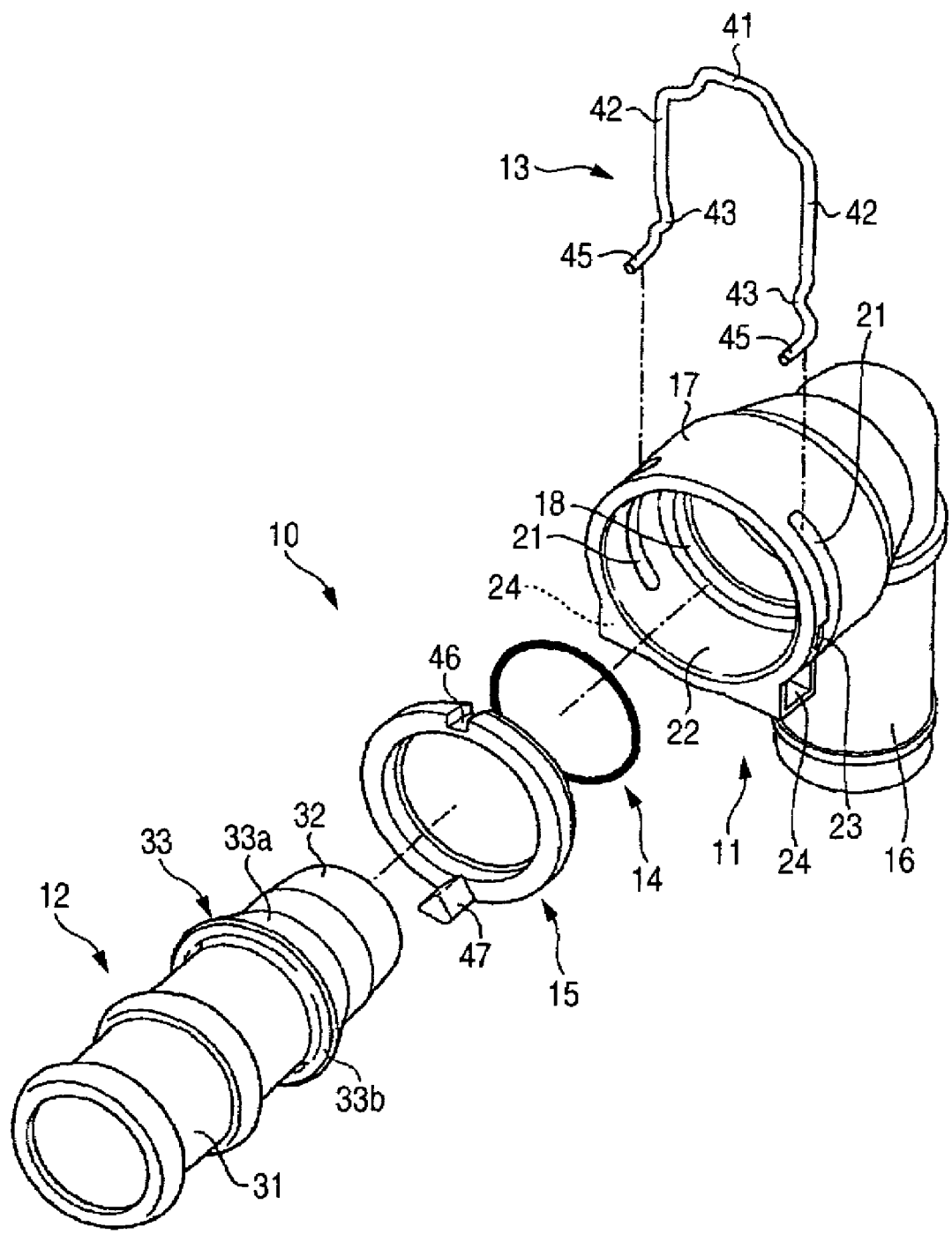
FIG. 1 is a disassembled perspective view showing an embodiment of a pipe joint according to the invention.

An explanation will be given of an embodiment of a pipe joint according to the invention in reference to FIGS. 1 through FIG. 6 as follows. As shown by FIG. 1, the pipe joint 10 is mainly constituted by a socket 11, a plug 12 inserted into the socket 11, a retaining wire 13 for preventing the plug 12 from being drawn out, a seal ring 14 arranged at inside of the socket 11, and a hold ring 15 similarly arranged at inside of the socket 11 for holding the seal ring 14.

Figure 2A:
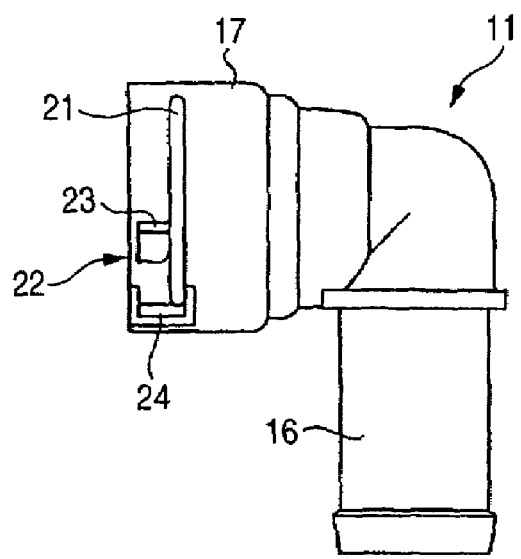
FIGS. 2A to 2C show a socket of the pipe joint.
Figure 2B:
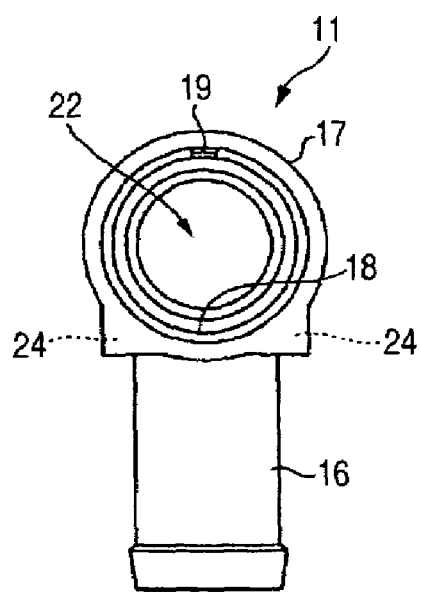
Figure 2C:
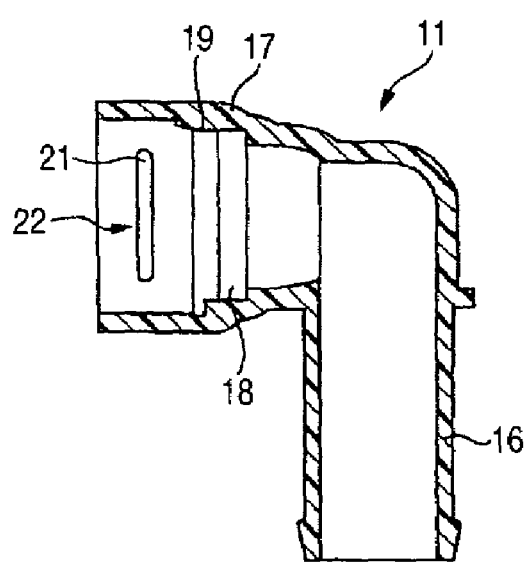
Figure 3:
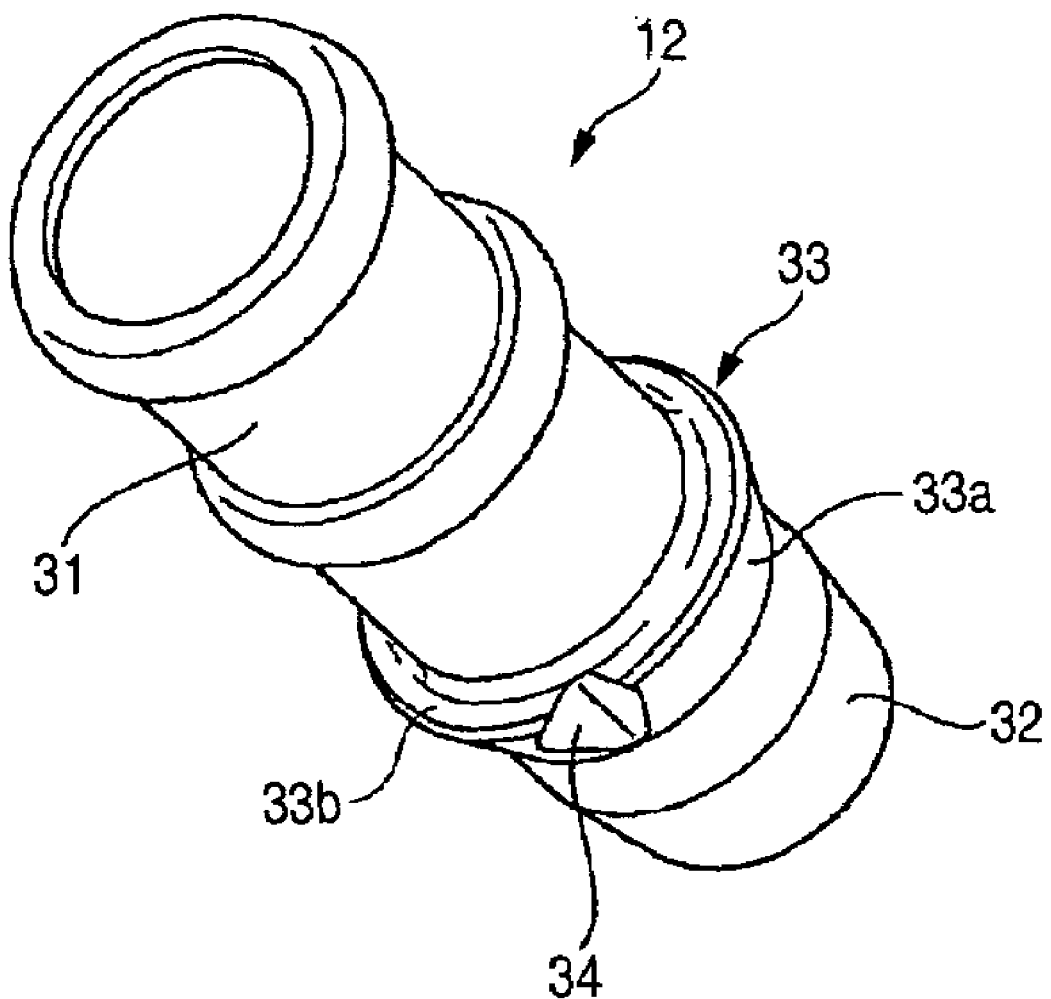
FIG. 3 is a perspective view showing a plug of the pipe joint.
Figure 4A:
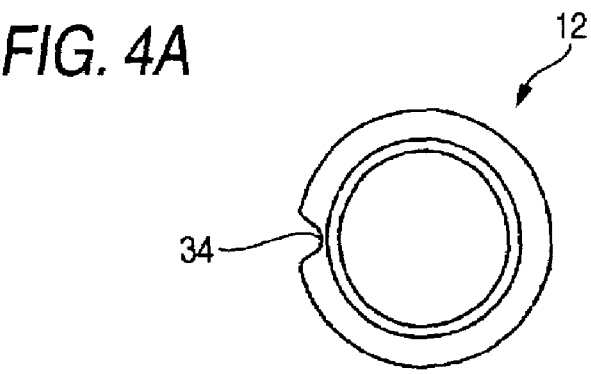
FIGS. 4A to 4C show the plug of the pipe joint.
Figure 4B:
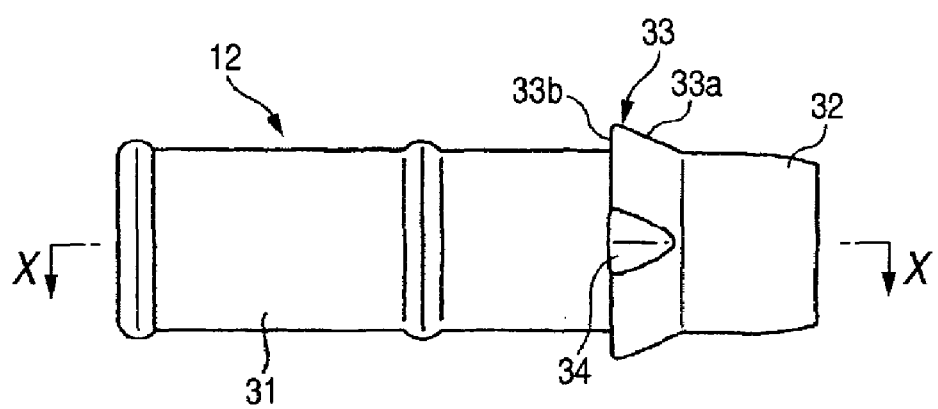
Figure 4C:
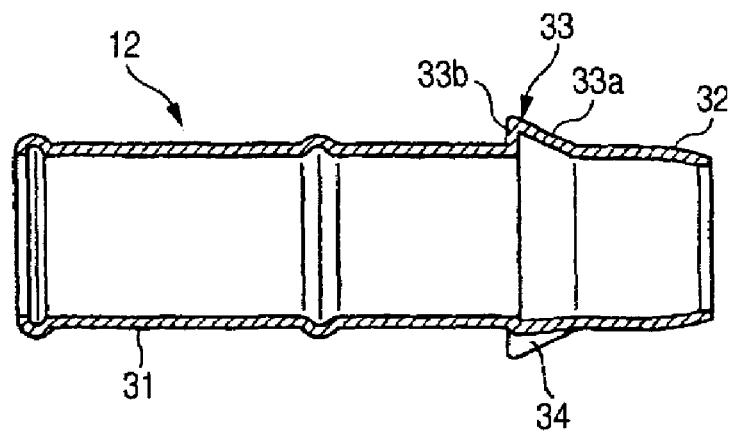

As shown by FIGS. 2A to 2C, the socket 11 includes a member in a tubular shape bent substantially by 90 degrees, one end portion thereof is provided with a pipe connecting portion 16 for connecting other tube of a hose, a tube or the like, and other end thereof is provided with a main body portion 17 inserted with the plug 12. However, the socket 11 may not only be the pipe bent by 90 degrees but may be an ordinary straight pipe.

An inner periphery of the main body portion 17 is provided with a seal ring containing portion 18 arranged with the seal ring 14. A front side of the seal ring containing portion 18 is press-fitted with the hold ring 15. Further, a projected portion 19 extended to a side of an inserting port 22 of the socket 11 is formed at one portion in a peripheral direction of the seal ring containing portion 18.

Both side faces of the main body portion 17 are formed with wire inserting slits 21 for inserting the retaining wire 13 in a direction substantially orthogonal to an axial direction. The retaining wire 13 is inserted into the wire inserting slits 21 and serves to prevent the plug 12 from being drawn out as mentioned later.

A temporary holding recess portion for temporary holding the retaining wire 13 is formed at a middle in a length direction of the wire inserting slit 21. Further, at a peripheral face of the main body portion 17, one end of the wire inserting slit 21 is formed with an engaging recess portion 24 for engaging the retaining wire 13 at a position of completely inserting the retaining wire 13.

As shown by FIG. 1, the retaining wire 13 is bent in a ridge-like shape at an upper center 41 thereof to constitute an inserting portion for drawing out the retaining wire 13 by inserting a screwdriver or the like to the portion. Further, both side portions 42 are bent in a gate-like shape and extended substantially in parallel with each other to be inserted into the wire inserting slits 21 of the socket 11. Further, middle portions of the both side portions 42 are provided with inner side bent portions 43 bent slightly to inner sides to be inserted into the wire inserting slits 21 to project to an inner periphery of the socket 11.

Furthermore, both end portions 45 of the retaining wire 13 are bent in a front direction and the both end portions 45 are made to be engaged with the temporary holding recess portions 23 and the engaging recess portions 24 of the socket 11. Further, in a state before connecting a pipe, the retaining wire 13 is temporary held by engaging the both end portions 45 with the temporary holding recess portions 23. Under the state, the inner side bent portions 43 are disposed at positions displaced downwardly relative to an axis core of the plug 12.

As shown by FIG. 3 and FIGS. 4A to 4C, the plug 12 is provided with a pipe connecting portion 31 connected with other pipe to be connected at one end thereof. However, the plug 12 may be a pipe directly formed at an apparatus to which the pipe is to be connected, for example, a heater unit, a radiator or the like.

A side thereof opposed to the pipe connecting portion 31 constitutes a front end portion 32 to be inserted into the socket 11. The front end portion 32 is contracted in a diameter thereof slightly in a direction of a front end thereof to provide inserting guiding performance. A ring-like projected portion 33 is formed at a predetermined distance from the front end portion 32 in an axial direction. A face of the ring-like projected portion 33 in an inserting direction constitutes a taper portion 33a a diameter of which is gradually contracted in the inserting direction. Further, a face on a side of the pipe connecting portion 31 contiguous to the taper portion 33a constitutes an engaging face 33b substantially orthogonal to an axis thereof. A recess portion 34 constituting substantially a V-like shape when viewed along the axial direction is formed at one portion in a peripheral direction of the ring-like projected portion 33.

Further, the ring-like projected portion 33 and the recess portion 34 can be worked even for a metal pipe. Therefore, according to the pipe joint 10 of the invention, the plug 12 may be constituted by a metal pipe and also a pipe of a metal directly formed at a heater unit, a radiator or the like can constitute the plug.

Figure 5A:
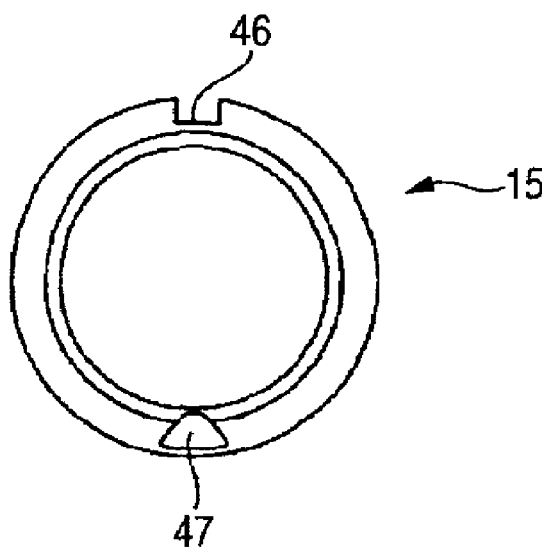
FIGS. 5A and 5B show a hold ring of the pipe joint.
Figure 5B:
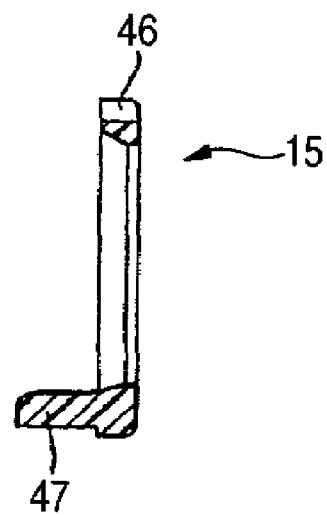

As shown by FIGS. 5A and 5B, the hold ring 15 includes a notched portion 46 formed along an axial direction at one portion in a peripheral direction thereof. The notched portion 46 is made to be fitted with the projected portion 19 formed at the inner periphery of the socket 11.

That is, after arranging the seal ring 14 at the seal ring containing portion 18 of the socket 11, when the hold ring 15 is inserted into the inner periphery of the socket 11, the hold ring 15 is prevented from being rotated relative to the socket 11 by inserting the hold ring 15 into such that the projected portion 19 of the socket 11 is inserted into the notched portion 46 to be press-fitted to fix to the inner periphery of the socket 11. Under the state, the hold ring 15 may be welded to the socket by ultrasonic welding or the like.

A projected portion 47 extended to the side of the inserting port 22 of the socket 11 along the axial direction is formed from one portion in the peripheral direction of the hold ring 15. The projected portion 47 constitutes substantially a triangular shape when viewed along the axial direction to constitute a shape of being fitted to the recess portion 34 formed at the ring-like projected portion 33 of the plug.

Next, operation of the pipe joint will be explained.

Figure 6:
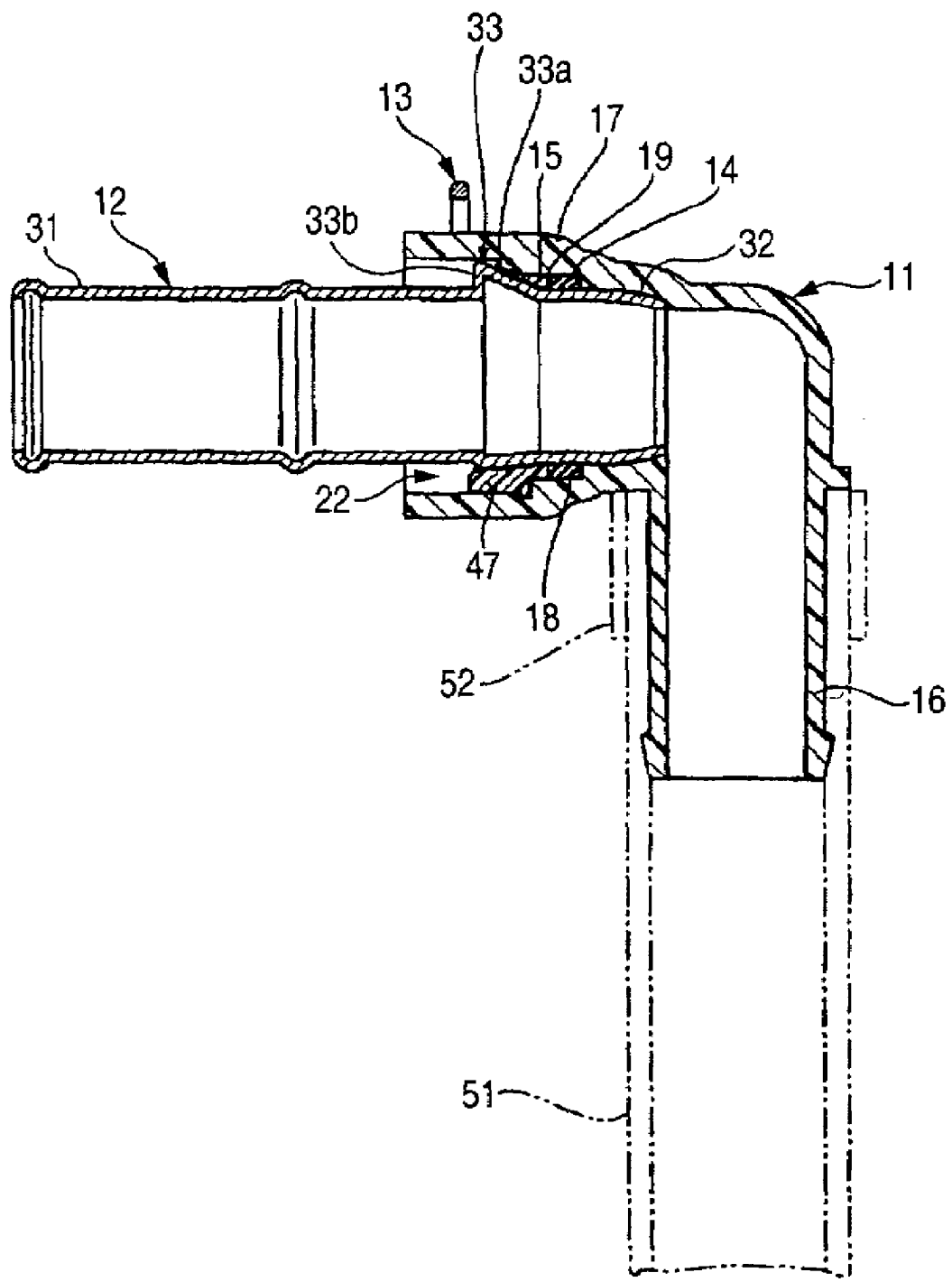
FIG. 6 is a sectional view showing a state of connecting a pipe by the pipe joint.

As shown by FIG. 6, the pipe connecting portion 16 of the socket 11 is inserted with a hose or a tube 51 connected to a pipe of a radiator, a heater unit, a fuel supply system or the like to fix by being fastened by a hose strap 52. Meanwhile, the pipe connecting portion 31 of the plug 12 is inserted with other hose or tube to be connected, not illustrated, to fix similarly. However, the pipe connecting portion 31 may be a pipe directly attached to an apparatus of a radiator, a heater unit or the like as mentioned above.

The retaining wire 13 is temporary held by engaging the both end portions 45 to the temporary holding recess portions 23 of the socket 11 as described above. Under the state, the front end portion 32 of the plug 12 is inserted into the inserting port 22 of the socket 11. The inner periphery of the socket 11 is arranged with the projected portion 47 of the hold ring 15 and therefore, the plug 12 can be pressed into the socket 11 only after disposing the projected portion 47 to a position of being fitted to the recess portion 34 of the ring-like projected portion 33 of the plug 12 by matching rotational positions of the plug 12 and the socket 11.

In this way, by fitting the projected portion 47 provided at the hold ring 15 at the inner periphery of the socket 11 to the recess portion 34 formed at the ring-like projected portion 33 of the plug 12, the plug 12 and the socket 11 are prevented from being rotated relative to each other. Further, when the plug 12 is pressed into the socket, the front end portion 32 of the plug 12 is inserted into an inner periphery of the seal ring 14 and an interval between the outer periphery of the plug 12 and the inner periphery of the socket 11 is sealed in airtight by the seal ring 14.

Further, the taper portion 33a of the ring-like projected portion 33 of the plug 12 is brought into contact with the both side portions 42, 42 of the retaining wire 13 and is advanced while pressing to widen the retaining wire 13 to outer sides. At this occasion, the inner side bent portions 43 of the retaining wire 13 are disposed at positions displaced downwardly relative to the axis core of the plug 12 and therefore, the inner side bent portions 43 are brought into contact with the taper portion 33a and are exerted with a component of force for moving the retaining wire 13 per se in being pressed to widen. Further, when the both side portions 42 of the retaining wire 13 exceed a top portion of the ring-like projected portion 33, the both side portions 42 are engaged with the engaging face 33b of the ring-like projected portion 33. At this occasion, the retaining wire 13 is moved further downwardly, and the both end portions 45 are engaged with the engaging recess portions 24.

As a result, the front end portion 32 of the plug 12 is engaged with a depth portion of the inner periphery of the socket 11, further, the retaining wire 13 is engaged with the engaging face 33b of the ring-like projected portion 33 of the plug 12 and therefore, the plug 12 is restricted from being moved in the axial direction relative to the socket 11 to be fixed to be prevented from being drawn out. In this way, the plug 12 can firmly be connected to the socket 11 in one touch motion by being fixed to be prevented from being drawn out while being prevented from being rotated relative to the socket 11.

Further, in the above-described embodiment, the notched portion 46 of the hold ring 15 may be a recess portion fitted with the projected portion 19 provided at the inner periphery of the socket 11. Incidentally, in press-fitting the hold ring 15 into the inner periphery of the socket 11, the notched portion 46 achieves an effect of facilitating to contract a diameter of the hold ring 15 to smoothly carry out press-fitting operation.

Further, although it is preferable to dispose the notched portion 46 and the projected portion 47 at positions in directions opposed to each other in view of strength of the hold ring 15, the notched portion 46 and the projected portion 47 can also be formed at arbitrary positions. Further, pluralities of the notched portions 46 and the projected portions can be provided. In that case, also a plurality of the recess portions 34 of the ring-like projected portions 33 of the socket need to provide in correspondence therewith.

Further, in place of the recess portion 34 of the ring-like projected portion 33 of the plug 12, for example, a flat portion (s) can be provided at one portion or a plurality of portions in a peripheral direction of the ring-like projected portion 33 and the hold ring 15 may be provided with a projected portion(s) brought into contact with the flat portion(s).

Figure 7:
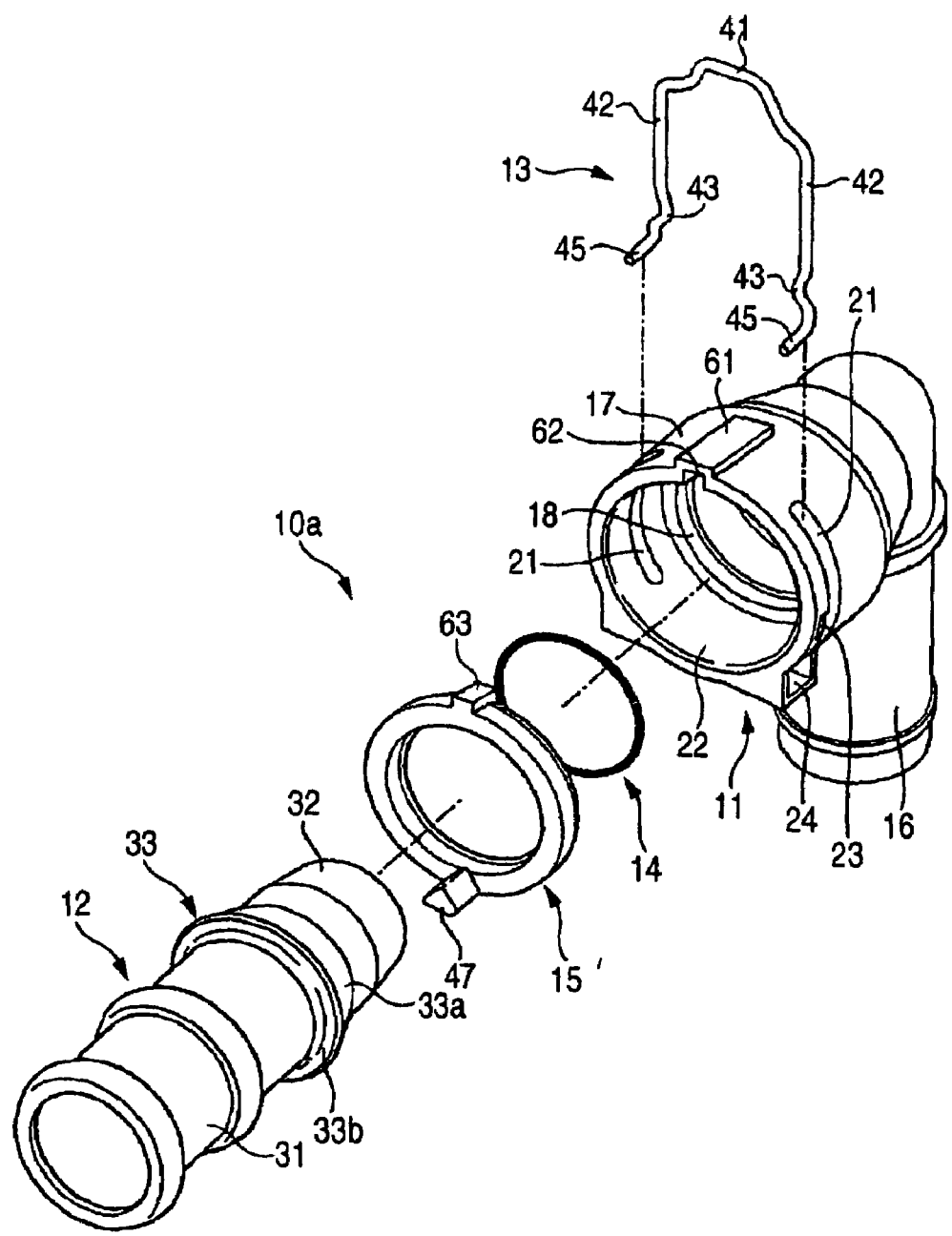
FIG. 7 is a disassembled perspective view showing other embodiment of a pipe joint according to the invention.

FIG. 7 shows other embodiment of a pipe joint according to the invention. Further, portions substantially the same as those of the embodiment shown in FIGS. 1 through 6 are attached with the same notations and an explanation thereof will be omitted.

The pipe joint 10a is formed with a bulged portion 61 at the peripheral wall of the socket 11 reaching an opening portion thereof along the axial direction, and an inner periphery of the bulged portion 61 constitutes a groove 62 reaching the opening portion along the axial direction. Further, the hold ring 15' is formed with a projected portion 63 at the outer periphery and the projected portion 63 is inserted into the groove 62.

Therefore, according to the pipe joint 10a, it is not necessary to provide the notched portion at the hold ring 15' and therefore, strength of the hold ring 15' is increased and can be made to be difficult to be cracked when the hold ring 15' is press-fitted into the inner periphery of the socket 11. Further, the projected portion 63 of the hold ring 15' can be inserted into the groove 62 from the opening portion of the socket 11 and therefore, rotational positioning relative to the socket 11 in inserting the hold ring 15' can be facilitated.

Figure 8:
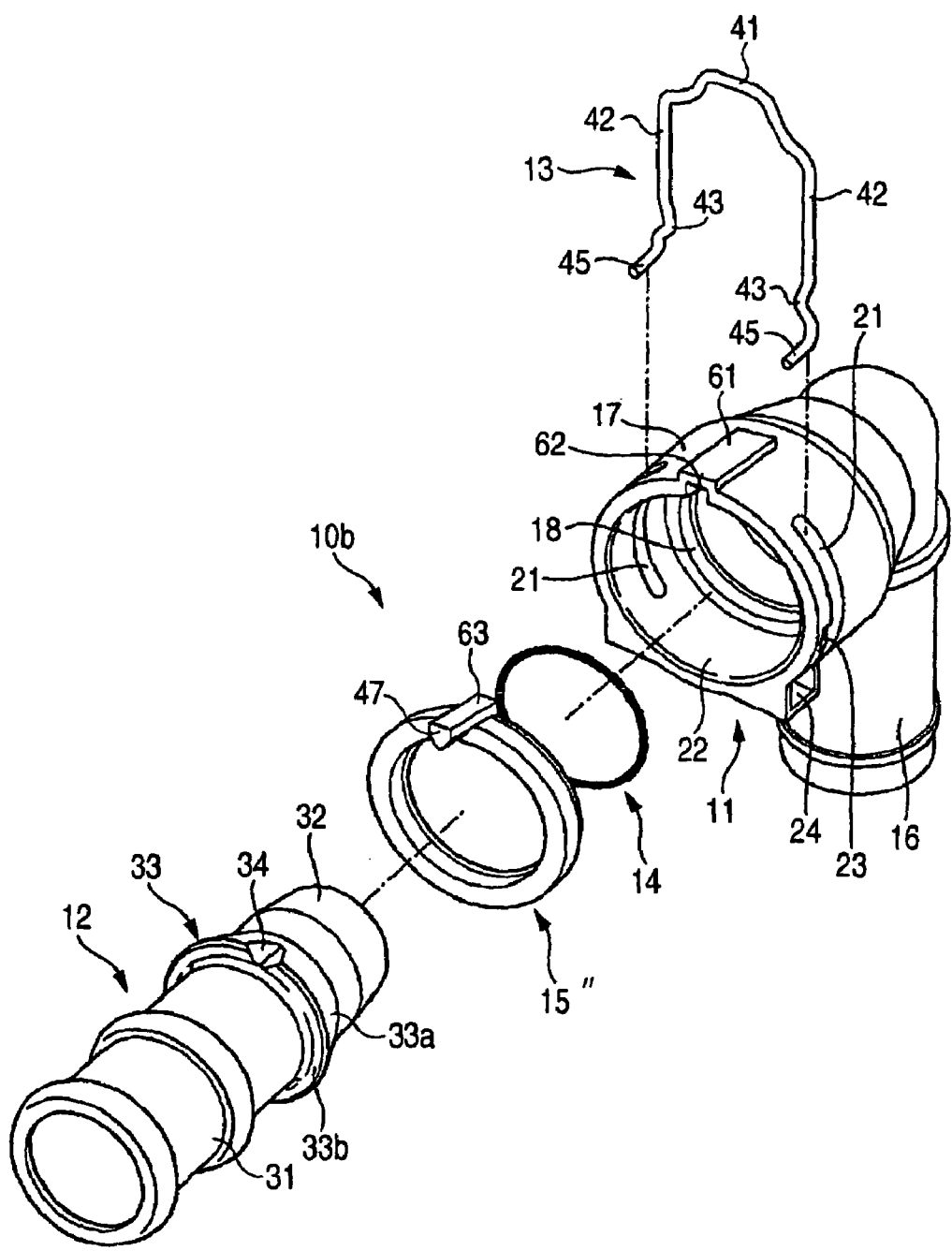
FIG. 8 is a disassembled perspective view showing still other embodiment of a pipe joint according to the invention.

FIG. 8 shows still other embodiment of the pipe joint according to the invention. Further, also in the embodiment, portions substantially the same as those of the embodiment shown in FIGS. 1 through 6 are attached with the same notations and an explanation thereof will be omitted.

The pipe joint 10b is formed with the bulged portion 61 at the peripheral wall of the socket 11 reaching the opening portion along the axial direction and the inner periphery of the bulged portion 61 constitutes the groove 62 reaching the opening portion along the axial direction. Further, the hold ring 15" is formed with the projected portion 63 at the outer periphery and the projected portion 63 is inserted into the groove 62.

Further, the projected portion 63 is extended in a columnar shape to the side of the inserting port 22 of the plug 12. Therefore, in comparison with those of the embodiments shown in FIGS. 1 through 7, the projected portion 47 is formed to be thick in a radius direction by an amount of a length projected in an outer diameter direction of the projected portion 63 to promote a strength of connecting to the hold ring 15". Further, in a state in which the projected portion 63 is engaged with the recess portion or the flat portion provided at the ring-like projected portion of the plug 12, a total of the projected portion 63 in the length direction is inserted into the groove 62 of the socket 11 and therefore, even when a rotational force is operated between the plug 12 and the socket 11, the rotational force is received by the groove 62 of the socket 11. Therefore, the projected portion 63 can be made to be difficult to be broken and a force of restricting rotation can be increased between the plug 12 and the socket 11 as well as between the socket 11 and the hold ring 15". In this way, the projected portion 63 is inserted into the recess portion 34 of the ring-like projected portion 33 of the plug 12 to restrict rotation of the plug 12 relative to the socket 11.

Therefore, according to the pipe joint 10b, a strength of connecting the projected portion 47 to the hold ring 15" is increased, the projected portion 47 can be prevented from being broken, and a force of restricting rotation of the plug and the socket relative to each other and a force of restricting rotation of the socket and the hold ring relative to each other can be increased.

The invention can be utilized as the pipe joint of the quick connector type suitable for connecting a pipe of a radiator, a heater unit, a fuel supply system or the like of an automobile.

What is claimed is:

1. A pipe joint comprising:
   a socket substantially in a tubular shape;
   a plug substantially in a tubular shape and inserted into an inserting port of the socket;
   a retaining unit for preventing the plug from being drawn out from the socket;
   a seal ring arranged at an inner periphery of the socket for sealing the inner periphery of the socket and an outer periphery of the plug; and
   a hold ring arranged at the inner periphery of the socket for hampering the seal ring from being moved, said hold ring comprising:
   a notched portion provided on the hold ring, the notched portion being fitted with a projected portion formed at a position of the inner periphery of the socket for attaching the hold ring; and
   a projected portion projected in a direction of the inserting port; and
   the plug includes a ring-shaped projected portion for engaging with the retaining unit, and a recess portion provided in the ring-shaped projected portion or a flat portion provided on the ring-shaped projected portion to be engaged with the projected portion of the hold ring,
   wherein the seal ring is disposed in a rear portion of the socket, the retaining unit is disposed adjacent to said seal ring at a position closer to a front portion of the socket, and the hold ring is disposed between the seal ring and the retaining unit,
   wherein the ring-shaped projected portion includes a taper portion, wherein a diameter of the taper portion becomes smaller along an insertion direction of the taper portion, and a face on a side of a pipe connecting portion contiguous to the taper portion, said face being substantially orthogonal to an axis of said taper portion, and
   wherein the projected portion of the hold ring is engaged with the recess portion or a flat portion provided at the ring-shaped projected portion from a side of the taper portion of the ring-shaped projected portion.

2. The pipe joint according to claim 1, wherein the ring-shaped projected portion of the plug has a tapered shape which is contracted toward an inserting direction, and the ring-shaped projected portion is formed with a recess portion in a V-shape in view from the axial direction.

3. The pipe joint of claim 1, wherein the projected portion comprises a V-shape in view from the axial direction.

4. The pipe joint of claim 1, wherein said notched portion and said projected portion are formed on opposing sides of said hold ring.

* * * * *